No. 75,492.  
C. F. VARLEY.  
TELEGRAPH POLE.  
PATENTED MAR. 10, 1868.
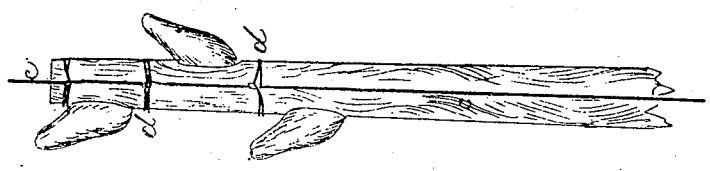
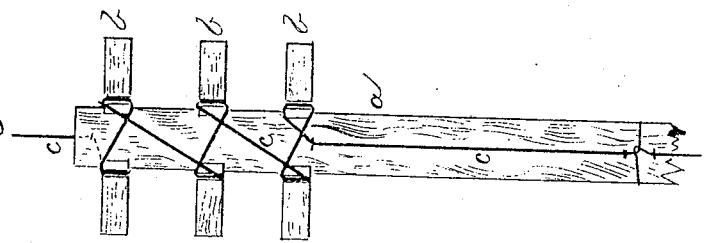

UNITED STATES PATENT OFFICE.

C. F. VARLEY, OF NEW YORK, N. Y.

IMPROVEMENT IN TELEGRAPH-POLES.

Specification forming part of Letters Patent No. 75,492, dated March 10, 1868.

*To all whom it may concern:*

Be it known that I, CROMWELL FLEETWOOD VARLEY, a British subject, now residing in the city, county, and State of New York, have invented a new and useful Improvement in Electric Telegraphs; and I do hereby declare that the following is a full, clear, and exact description thereof, reference being had to the accompanying drawings, making part of this specification, in which—

Figure 1 is an elevation of a pole for holding the telegraphic wires, with my said improvement applied thereto, and Fig. 2 an elevation of a modification thereof.

In telegraphic lines consisting of more than one conducting-wire, in case of a "leak" in any one wire by reason of any imperfection in the insulators, the current thus leaking is liable to run to the other wires, or some of them, and thereby to produce a disturbance in the messages transmitted.

The object of my said invention is to avoid the difficulty above stated, which consists in combining with the pole which sustains the wires and with the insulators attached thereto a conducting-wire extending into the ground for conducting off and discharging such leak, and thereby prevent it from reaching the other wires.

In Fig. 1 of the accompanying drawings, *a* represents an ordinary telegraph-pole with cross-arms *b*, to which the insulators are attached. To this pole I secure a conducting-wire, *c*, which is secured to the upper part of the pole, and which may be provided with a point projecting upward to act as a lightning-rod to receive and discharge electricity from the atmosphere. It is then wrapped around the upper one of the arms *b*, on one side of the pole; then to and around the arm *b* on the opposite side, and then, crossing the pole, down to the second arm, *b*, wrapped around that on one side of the pole, and then around the same arm on the other side of the pole, and, in like manner, around the other arms, and, finally, down into the ground.

I prefer to indent or notch the arms where the wire is wrapped around them, to prevent currents from being conducted under the wire by moisture lodging on the surface of the arms in case the wires should not be in contact.

When the poles are made without arms, and with the insulators attached directly to the poles, as represented in Fig. 2 of the accompanying drawings, the wire *c* should be wrapped around the pole between the several insulators, as at *d*, and then run down into the ground, and when so applied I prefer to indent the pole where the wire is wrapped around it, and for the reason stated above as to the indenting of the arms.

What I claim as my invention, and desire to secure by Letters Patent, is—

The combination of a conducting-wire running to the ground with the telegraph-pole and the insulators attached thereto, substantially as and for the purpose set forth.

C. F. VARLEY.

Witnesses:
 WM. H. BISHOP,
 A. DE LACY.